(12) United States Patent
Muylaert et al.

(10) Patent No.: US 8,777,151 B2
(45) Date of Patent: Jul. 15, 2014

(54) METHOD FOR CONNECTING A TENSION-TORSION STRAP

(75) Inventors: Neal W. Muylaert, Apache Junction, AZ (US); Lyndon Claudius Lamborn, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 113 days.

(21) Appl. No.: 13/276,728

(22) Filed: Oct. 19, 2011

(65) Prior Publication Data

US 2012/0034088 A1 Feb. 9, 2012

Related U.S. Application Data

(62) Division of application No. 12/272,957, filed on Nov. 18, 2008.

(51) Int. Cl.
*B64C 27/24* (2006.01)
(52) U.S. Cl.
USPC .................................. 244/17.11; 416/134 A
(58) Field of Classification Search
USPC ........... 244/17.11; 29/592, 897.3; 416/134 A, 416/158
See application file for complete search history.

(56) References Cited

U.S. PATENT DOCUMENTS

| 4,244,677 | A |   | 1/1981  | Noehren et al. |
| 4,251,187 | A |   | 2/1981  | Hollrock |
| 4,534,704 | A |   | 8/1985  | McArdle |
| 4,543,040 | A |   | 9/1985  | McArdle et al. |
| 4,568,245 | A |   | 2/1986  | Hibyan et al. |
| 4,676,720 | A |   | 6/1987  | Niwa et al. |
| 4,868,962 | A |   | 9/1989  | McArdle et al. |
| 4,961,687 | A | * | 10/1990 | Bost et al. ..................... 416/230 |
| 4,975,021 | A |   | 12/1990 | Wagner et al. |
| 5,092,738 | A |   | 3/1992  | Byrnes et al. |
| 5,100,294 | A | * | 3/1992  | Crannage et al. ......... 416/134 A |
| 5,110,259 | A |   | 5/1992  | Robinson |
| 5,120,195 | A |   | 6/1992  | Schmaling et al. |
| 5,203,522 | A | * | 4/1993  | White et al. ............... 244/17.11 |
| 5,460,487 | A |   | 10/1995 | Schmaling et al. |
| 5,499,903 | A |   | 3/1996  | Schmaling et al. |
| 5,645,400 | A |   | 7/1997  | Hunter et al. |
| 7,047,596 | B2 | * | 5/2006 | Sucic et al. ..................... 16/2.1 |
| 2008/0101934 | A1 | * | 5/2008 | Stamps et al. ............ 416/134 A |

* cited by examiner

*Primary Examiner* — Rob Swiatek
*Assistant Examiner* — Vincente Rodriguez
(74) *Attorney, Agent, or Firm* — Yee & Associates, P.C.

(57) ABSTRACT

An apparatus may comprise a housing, a first member, and a second member. The housing may have a first end, a second end, a first side, a second side, an opening located in the first end, and a passage extending from the opening. The first member may extend from the first side. The first member may have a first channel in communication with the passage and the channel has a first center axis. The second member may extend from the first side. The second member may have a second channel in communication with the passage and the second channel has a second center axis substantially aligned with the center axis of the channel in the first member.

16 Claims, 7 Drawing Sheets

METHOD FOR CONNECTING A TENSION-TORSION STRAP

This application is a divisional of application Ser. No. 12/272,957, filed Nov. 18, 2008, status pending.

BACKGROUND INFORMATION

1. Field

The present disclosure relates generally to aircraft and, in particular, to a method and apparatus for a helicopter assembly. Still more particularly, the present disclosure relates to a method and apparatus for an assembly that connects a helicopter rotor blade to a hub.

2. Background

The rotor system of a helicopter may be the rotating part of a helicopter that generates lift. A rotor system may be mounted horizontally to provide vertical lift. In some cases, a tilt rotor may be used in which the rotor may be mounted on a pylon that may rotate from a horizontal plane to a vertical plane. A rotor system may include a hub and rotor blades. The hub may provide an attachment point for rotor blades. The rotor blades may be attached to the hub using various methods.

For example, without limitation, rotor blades may be connected to the hub in a rigid manner. With this type of rotor system, the blades are not hinged in the flap or drag axes but may be feathered in order to vary thrust and cyclic blade pitch.

Another type of rotor system is a semi-rigid rotor system. With this type of rotor system, flapping and feathering may occur. The blades may be rigidly attached to the hub. The hub may then be attached to a mast in which the hub may tilt with respect to the shaft.

With a fully articulated rotor system, each blade may be attached to the hub through a number of hinges. These hinges may allow a blade to move independently of the other blades. The independent movement may be such that the blades may change pitch but do not change location relative to the rotational axis of the rotor. These types of rotor systems may allow the blades to flap, feather, lead, lag, and/or otherwise move independently of the other blades.

With fully articulated rotor systems, different types of architectures may be used to connect the blades to the hub. For example, without limitation, a bearing-based connection system or a bearingless connection system may be used. With a bearingless connection system, a flexible structural member may be used to connect and/or retain a blade to a hub in a rotor system. This flexible structural member may allow a capability to control the position of a blade in an accurate manner. These positions may allow for motions such as, for example, without limitation, flap wise bending motions, end wise bending motions, torsional change motions, or other suitable motions.

The flexible structural member may replace older designs, which may use a hinge and/or journal-type bearings at the connection of the blade to the hub. This type of design may also be referred to as a flex beam or flex beam connector.

When replacing an older rotor assembly with a flex beam assembly, it may be desirable to keep the different dimensions, materials, and/or other suitable features of the current system as close to the original design as possible. This type of goal may be desirable to maintain performance in other flight features from the original design. With these types of requirements, changing a bearing-based rotor system to a bearingless rotor system may be challenging to maintain as many structural parameters as possible close to original design specifications.

Therefore, it would be advantageous to have a method and apparatus for assembling a rotor system that overcomes the issues described above as well as possibly other issues.

SUMMARY

In one advantageous embodiment, an apparatus may comprise a housing, a first member, and a second member. The housing may have a first end, a second end, a first side, a second side, an opening located in the first end, and a passage extending from the opening. The first member may extend from the first side. The first member may have a first channel in communication with the passage and the channel has a first center axis. The second member may extend from the first side. The second member may have a second channel in communication with the passage and the second channel has a second center axis substantially aligned with the center axis of the channel in the first member.

In another advantageous embodiment, an apparatus may comprise a sleeve, a first bushing, and a second bushing. The sleeve may have a first end, a second end, a first side, a second side, an opening located in the first end, and a channel extending from the opening in the first end towards the second end in the sleeve. The channel may be configured to guide an insertion of a tension-torsion strap into the channel, and the channel has a number of ramps capable of guiding the insertion of the tension-torsion strap into the channel, wherein the second end forms an environmental barrier. The first bushing may have a first end and a second end extending from the first side in a first direction substantially normal to the first side of the sleeve. The first bushing may have a channel in communication with a hole on the first end and in communication with the channel in the sleeve, and the channel has a center axis. The second bushing may have a first end and a second end extending from the first side in a second direction substantially normal to the second side of the sleeve. The second bushing may have a channel in communication with a hole on the first end and in communication with the channel in the sleeve, and the channel may have the center axis that is substantially aligned with the center axis of the channel in the first bushing. A first end of the tension-torsion strap may extend through the opening in the first end of the sleeve into the channel in the sleeve, and a pin may extend through the channel of the first bushing, the first end of the tension-torsion strap, and the channel of the second bushing to connect the first end of the tension strap to the sleeve. The first bushing and the second bushing may each have a wall thickness sufficient to support the pin placed through the first bushing, the second bushing, and the tension-torsion strap to reduce bending moment forces on the pin and pin bending of the pin. The first bushing and the second bushing reduce a gap between the tension-torsion strap, a first wall, and a second wall of a hub when the tension-torsion strap is secured to the first wall and the second wall by the pin placed through the first bushing and the second bushing. The tension-torsion strap may allow for torsional movement and may have an axial strength capable of retaining a blade to the hub.

In yet another advantageous embodiment, a method may be present for connecting a tension-torsion strap. A sleeve may be slid into an arm of a hub. Holes in the sleeve may be aligned with holes in the hub. A bushing may be installed in each aligned hole in the sleeve. A first end of the tension-torsion strap may be slid through into the sleeve. A pin may be placed through the bushings and the tension-torsion strap.

In still another advantageous embodiment, a method is present for connecting a tension-torsion strap for an aircraft. A sleeve may be slid into an arm of a hub. Holes in the sleeve may be aligned with holes in the hub. A bushing may be installed in each aligned hole in the sleeve. A first end of the tension-torsion strap may be slid through into the sleeve. A pin may be placed through the bushings and the tension-torsion strap. The second end of the tension-torsion strap may be secured to a blade. The bushings installed in each hole aligned to the sleeve form an interference fit to form a retention system.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
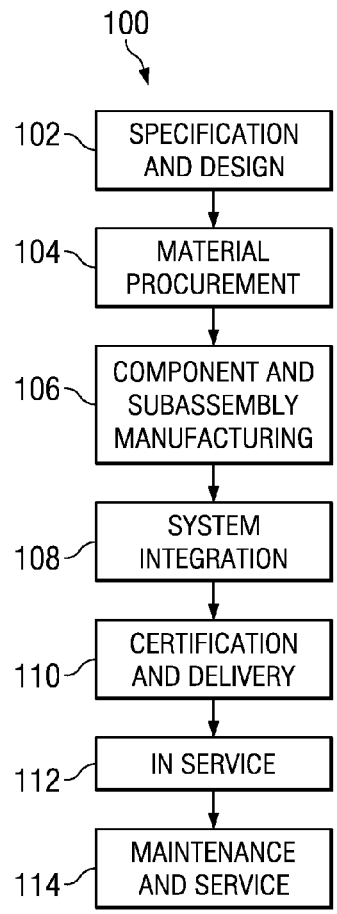
FIG. 1 is a diagram illustrating an aircraft manufacturing and service method in accordance with an advantageous embodiment.
Figure 2:
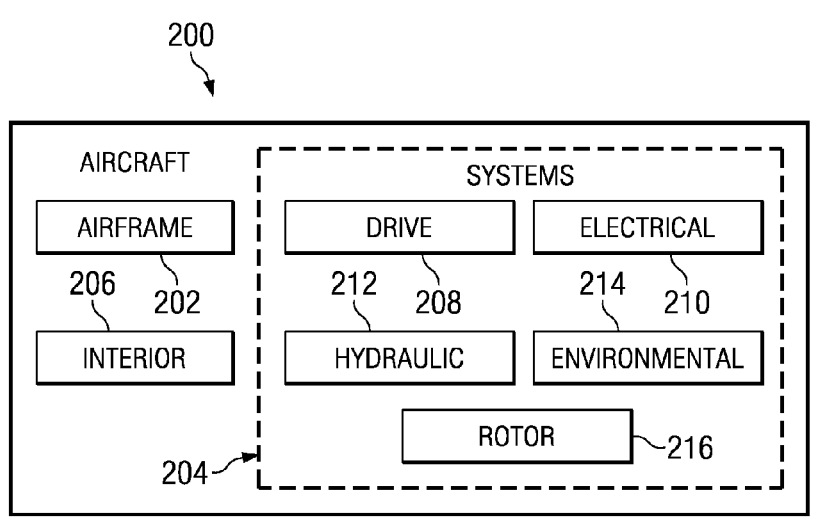
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. In these examples, aircraft 200 may be a helicopter and/or some other aircraft that may employ blades that may rotate substantially horizontal to the ground.

Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft may be depicted in which an advantageous embodiment may be implemented. In this example, aircraft 200 may be a helicopter produced by aircraft manufacturing and service method 100 in FIG. 1 and may include airframe 202 with a plurality of systems 204 and interior 206. Examples of systems 204 include one or more of drive system 208, electrical system 210, hydraulic system 212, environmental system 214, and rotor system 216. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, without limitation, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more apparatus embodiments, method embodiments, or a combination thereof may be utilized while aircraft 200 is in service 112 or during maintenance and service 114 in FIG. 1.

The different advantageous embodiments recognize that in minimizing changes to an aircraft in the form of a helicopter when replacing a bearing-based rotor system with a bearingless rotor system, difficulties may be encountered in connecting a blade to a hub using a flexible structural member, while maintaining durability of the hub. With a flexible structural member, this member may connect a blade to a hub using pins.

The different advantageous embodiments recognize that with the current shape of the channel and the arm of a hub, an undesirable gap may exist between a flexible structural member and the hub as a result of current manufacturing processes. This gap may result in more force on the pin than desired when the pin secures the flexible structural member to the hub.

Some solutions may include using a larger pin to reduce bending. The different advantageous embodiments recognize that this type of solution may result in increased weight and an increased inability to meet dynamic requirements to maintain the connections. The different advantageous embodiments also recognize that a design in a spindle for receiving a flexible structural member may be oval in shape due to current designs for fixed linkages between the blade and hub. Designing a method for providing a size and shape of the hole to receive a flexible structural member may be expensive and difficult to implement in a manufacturing process.

Thus, the different advantageous embodiments may provide a method and apparatus for connecting a flexible structural member to a hub. In one advantageous embodiment, a housing having a first end, a second end, a first side, a second side, an opening located in the first end, and a channel extending from the opening in the first end towards the second end in the housing are present. A first member has a channel in communication with the hole in the first end of the first member in which the channel may be in communication with the channel in the housing.

A second member has a channel in communication with a hole in the first end of the second member and in which the channel may be in communication with the channel in the housing. The channel in the first member and the channel in the second member may each have a center axis that may be substantially aligned to each other.

The different advantageous embodiments recognize and take into account that when a flexible structural member such as, for example, without limitation, a tension-torsion strap, may be used, a width of the strap may be such that a gap may be present between the tension-torsion strap and an upper wall and a lower wall within the hub of the rotor system. A pin placed through a hole to secure the tension-torsion strap to the hub may encounter bending moments that may be greater than if a gap were absent.

The different advantageous embodiments also recognize that a tapered bore in the hub may be used to overcome some or all of the issues described. This type of bore, however, may cause the hub to be too expensive to fabricate. In contrast, the different advantageous embodiments may allow for the use of a straight bore and less expensive hub.

The different advantageous embodiments recognize and take into account that one solution may involve using a tension-torsion strap that may be wider or taller. This type of design solution, however, may not provide the performance characteristics and physical clearances that are desired.

The different advantageous embodiments may reduce bending moments on a pin used to retain a tension-torsion strap to a hub. Further, the different advantageous embodiments may provide a loading ramp in the housing to facilitate the assembly of the tension-torsion strap into the hub, especially in the event that the installation cannot be aided with visual feedback. Also, one end of the housing may provide an environmental seal and/or barrier.

Figure 3:
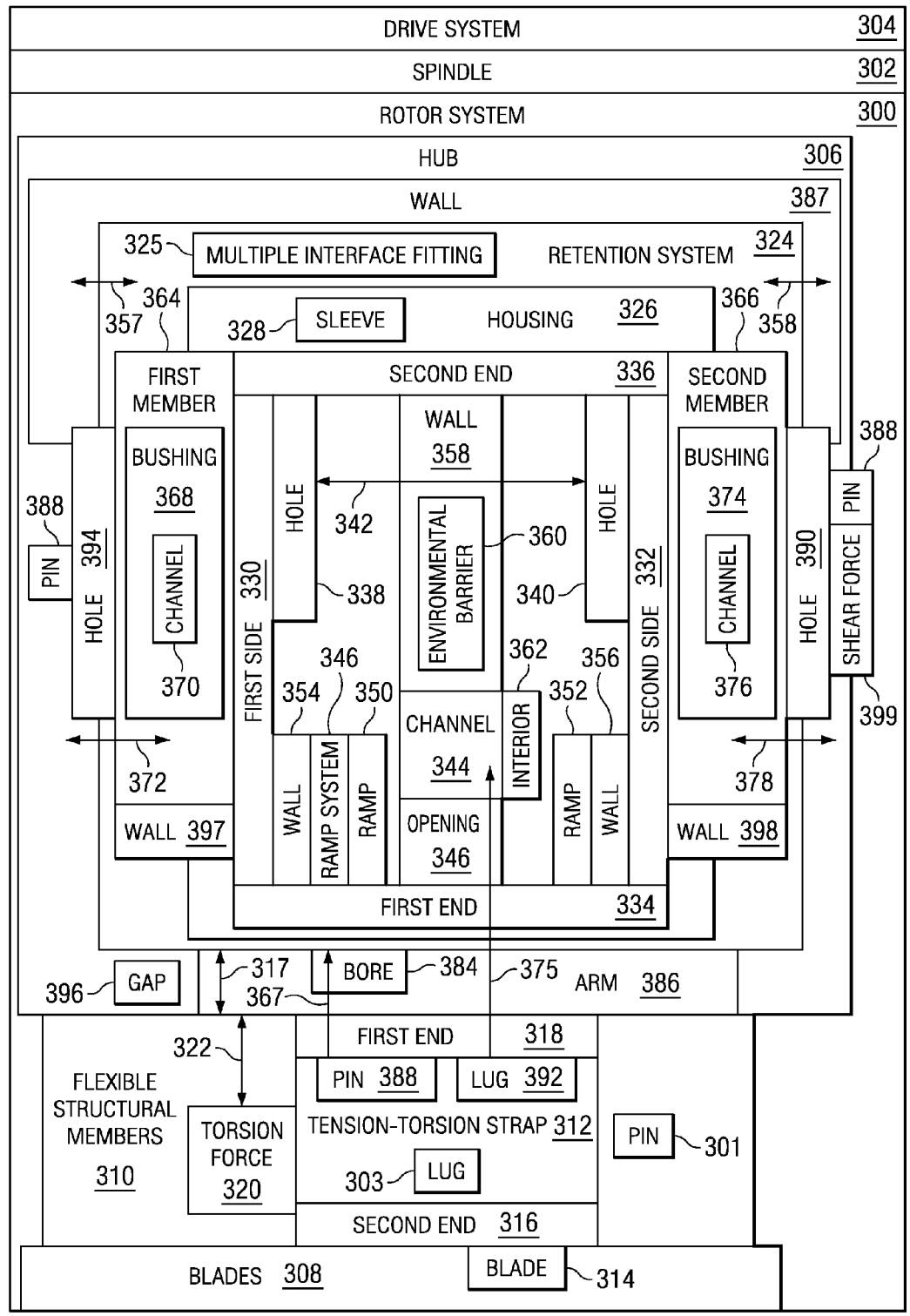
FIG. 3 is a diagram of a rotor system in accordance with an advantageous embodiment.

With reference now to FIG. 3, a diagram of a rotor system may be depicted in accordance with an advantageous embodiment. In this illustrative example, rotor system 300 may be connected to spindle 302. Spindle 302 may, in turn, be connected to drive system 304. Drive system 304 may turn spindle 302 to turn rotor system 300.

In this advantageous embodiment, rotor system 300 may include hub 306 and blades 308. Blades 308 may be attached to hub 306 using flexible structural members 310. For example, without limitation, tension-torsion strap 312 may connect blade 314 in blades 308 to hub 306. Tension-torsion strap 312 and other forms of flexible structural members 310 may be comprised of various materials. In particular, the materials selected may depend on particular implementations.

For example, without limitation, tension-torsion strap 312 may be comprised of a material and/or have a cross-sectional shape that may be torsionally soft and axially stiff. In other words, tension-torsion strap 312 may allow for torsion force 320 to be applied to tension-torsion strap 312 when adjusting and/or positioning blade 314. Tension-torsion strap 312 may be stiff in axial direction 322 to provide strength in connecting blade 314 to hub 306.

In these illustrative examples, second end 316 may be connected to blade 314, as shown by arrow 317, while first end 318 of tension-torsion strap 312 may be connected to hub 306. In particular, first end 318 may be connected using retention system 324 located within hub 306. Retention system 324 may be multiple function interface fitting 325.

In this depicted example, retention system 324 may include housing 326, which may provide a structure and/or frame for retention system 324. Housing 326 may take the form of sleeve 328. Housing 326 may have first side 330, second side 332, first end 334, and second end 336. Hole 338 may be located in first side 330, while hole 340 may be located in second side 332. Hole 338 and hole 340 may be aligned along axis 342.

Further, housing 326 may have channel 344, which may extend from opening 346 at first end 334. Housing 326 may also have ramp system 348, which may include ramps 350 and 352. Ramp 350 may be located on wall 354, while ramp 352 may be located on wall 356. Wall 358 may be located at second end 336 and may function as environmental barrier 360 to prevent matter from entering interior 362 of hub 306 through channel 344 of housing 326. In particular, environmental barrier 360 may prevent, for example, without limitation, particles, gases, foreign objects, debris, moisture, and/or other matter from accumulating within hub 306.

Further, retention system 324 also may have first member 364 and second member 366. First member 364 may be bushing 368 having channel 370. Channel 370 may have center axis 372. Center axis 372 may be an axis through a center of channel 370. Second member 366 may take the form of bushing 374 having channel 376, which may have center axis 378. In these illustrative examples, channel 370 and channel 376 may be a bore. First member 364 may extend from hole 338 in first side 330, while second member 366 may extend from hole 340 in second side 332, as shown by arrow 367.

In these examples, first member 364 and second member 366 may be formed integrally as part of housing 326. In other advantageous embodiments, first member 364 and second member 366 may be placed into holes 338 and 340, respectively. First member 364 and/or second member 366 may be retained in holes 338 and 340 through an interference fit.

In the advantageous embodiments, first end 318 of tension-torsion strap 312 may be placed into hub 306 through bore 384 in arm 386 of hub 306. First end 318 may be guided into channel 344 of housing 326 through ramp system 348 within channel 344, as shown by arrow 375. Pin 388 may be placed through hole 390, channel 370 of first member 364, lug 392 in tension-torsion strap 312, channel 376 in second member 366, and hole 394 in hub 306 to secure tension-torsion strap 312 to hub 306.

Gap 396 between hub 306 and tension-torsion strap 312 may be reduced through the use of first member 364 and second member 366. In other words, first member 364 and second member 366 may provide support and may reduce bending moment forces on pin 388. First member 364 and second member 366 may form a continuous support because their simultaneous and continuous communication with walls 387 of hub 306, as shown by arrows 357 and 358, and first and second sides 330 and 332 of housing 326. This arrangement may reduce gap 396.

Further, first member 364 may have wall 397 and second member 366 may have wall 398, each with thicknesses sufficient to reduce and/or prevent bending of pin 388. In other words, first member 364 and second member 366 provide additional support for pin 388. This additional support may spread shear force 399 along more of pin 388 than currently available without retention system 324. Pin 301 around second end 316 of tension-torsion strap 312 may be placed through lug 303 to attach second end 316 of tension-torsion strap 312 to blade 314.

The illustration of rotor system 300 in FIG. 3 is not meant to imply physical or architectural limitations to the manner in which different advantageous embodiments may be implemented. Other advantageous embodiments may have other components in addition to or in place of the ones illustrated. Further, other components illustrated may be combined together or separated depending on the functionality and implementation.

For example, in some advantageous embodiments, ramp system 348 may be unnecessary. In yet other advantageous embodiments, only ramp 350 may be present without any need for ramp 352. In some advantageous embodiments, first member 364 and also second member 366 may extend into channel 370 depending on the width of tension-torsion strap 312.

In these illustrative examples, retention system 324 may provide a number of different features. For example, without limitation, retention system 324 may span gap 396 between walls 397 and 398 within interior 362 of hub 306 and tension-torsion strap 312. The reduction of gap 396 may reduce bending forces applied to pin 388.

Further, ramp system 348 within retention system 324 also may aid in the assembly process for locating and/or replacing tension-torsion strap 312 into sleeve 328 for attachment.

Figure 4:
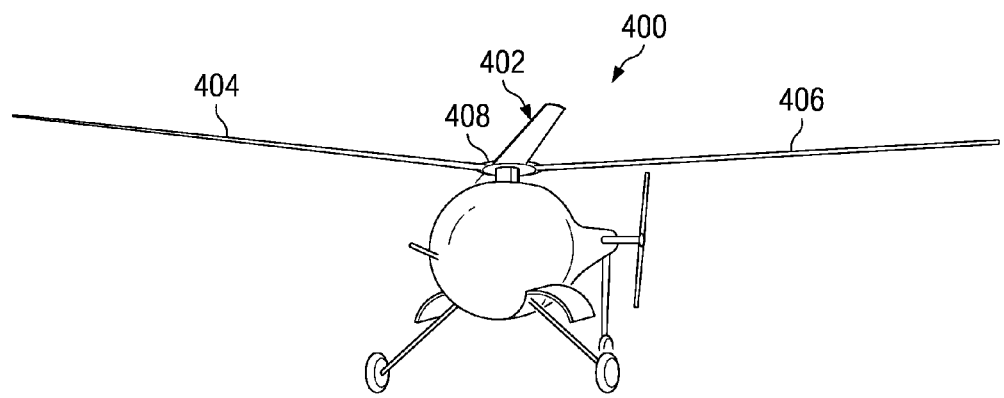
FIG. 4 is a diagram of a helicopter in accordance with an advantageous embodiment.

With reference now to FIG. 4, a diagram of a helicopter may be depicted in accordance with an advantageous embodiment. Helicopter 400 may be an example of one implementation of aircraft 200 in FIG. 2. In this example, helicopter 400 has rotor system 402. Rotor system 402 may be an example of one implementation of rotor system 300 in FIG. 3. In this depicted example, rotor system 402 may include blades 404 and 406 attached to hub 408. In these examples, blades 404 and 406 may be attached to hub 408 using flexible structural members (not shown) with retention systems (not shown) in accordance with an advantageous embodiment.

Figure 5:
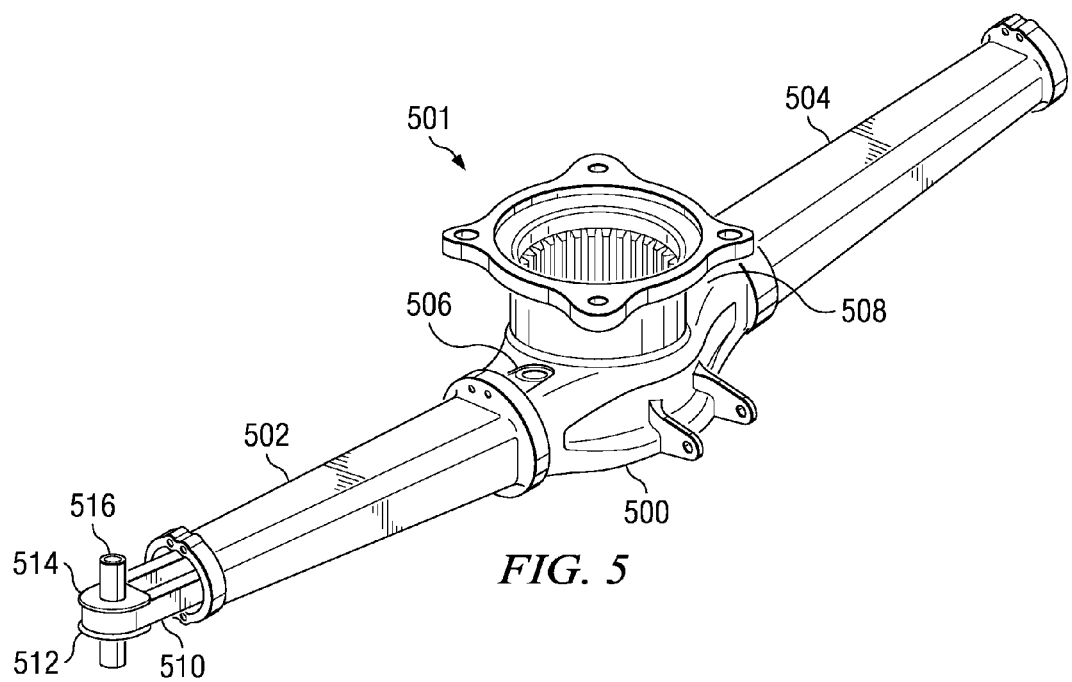
FIG. 5 is a diagram of a portion of a rotor system in accordance with an advantageous embodiment.

With reference now to FIG. 5, a diagram of a portion of a rotor system may be depicted in accordance with an advantageous embodiment. In this example, rotor system 501 may be an example of one implementation of rotor system 300 in FIG. 3 that may be used in helicopter 400 in FIG. 4.

In this illustrative example, hub 500 may have arms 502 and 504. In this example, retention systems 506 and 508 may have been installed within hub 500. Tension-torsion strap 510 may be an example of a flexible structural member attached to hub 500 with retention system 506.

End 512 of tension-torsion strap 510 may be attached to blade 314 in FIG. 3. In this example, end 512 of tension-torsion strap 510 may have bushing shoe 514, which may receive pin 516 to attach end 512 to blade 314.

Figure 6:
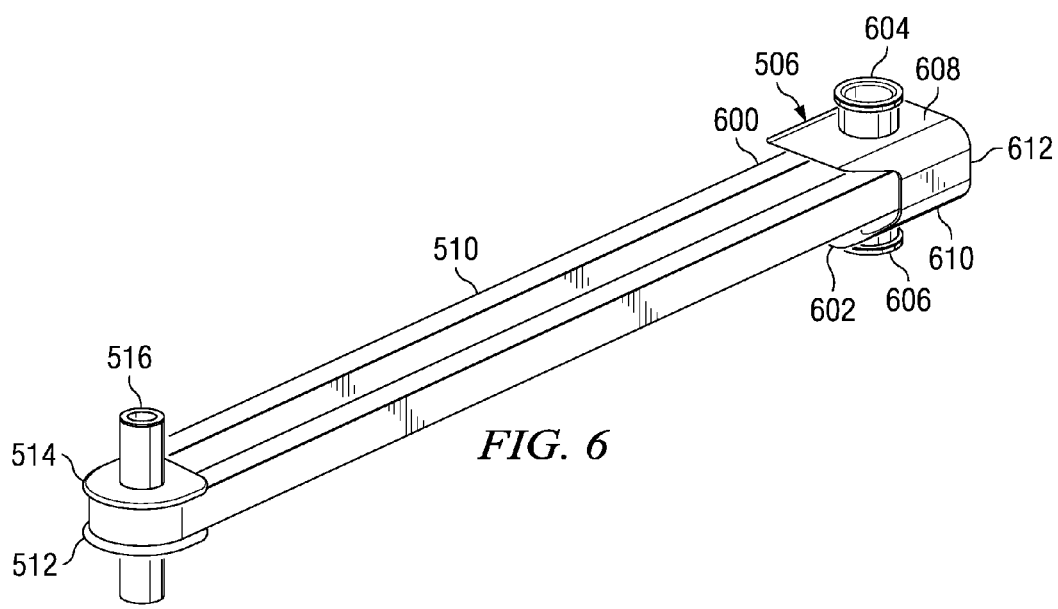
FIG. 6 is a diagram illustrating a tension-torsion strap inserted into a retention system in accordance with an advantageous embodiment.

With reference now to FIG. 6, a diagram illustrating a tension-torsion strap inserted into a retention system may be depicted in accordance with an advantageous embodiment. In this illustrative example, end 600 of tension-torsion strap 510 may be shown inserted into opening 602 of retention system 506.

In this view, bushing 604 and bushing 606 may extend from top side 608 and bottom side 610, respectively, of retention system 506. Bushing 604 and bushing 606 in sleeve 612 may be formed from various materials. The material selected may depend on the particular implementation. For example, without limitation, these materials may be steel, aluminum, magnesium, titanium, bronze, or some other suitable material.

Figure 7:
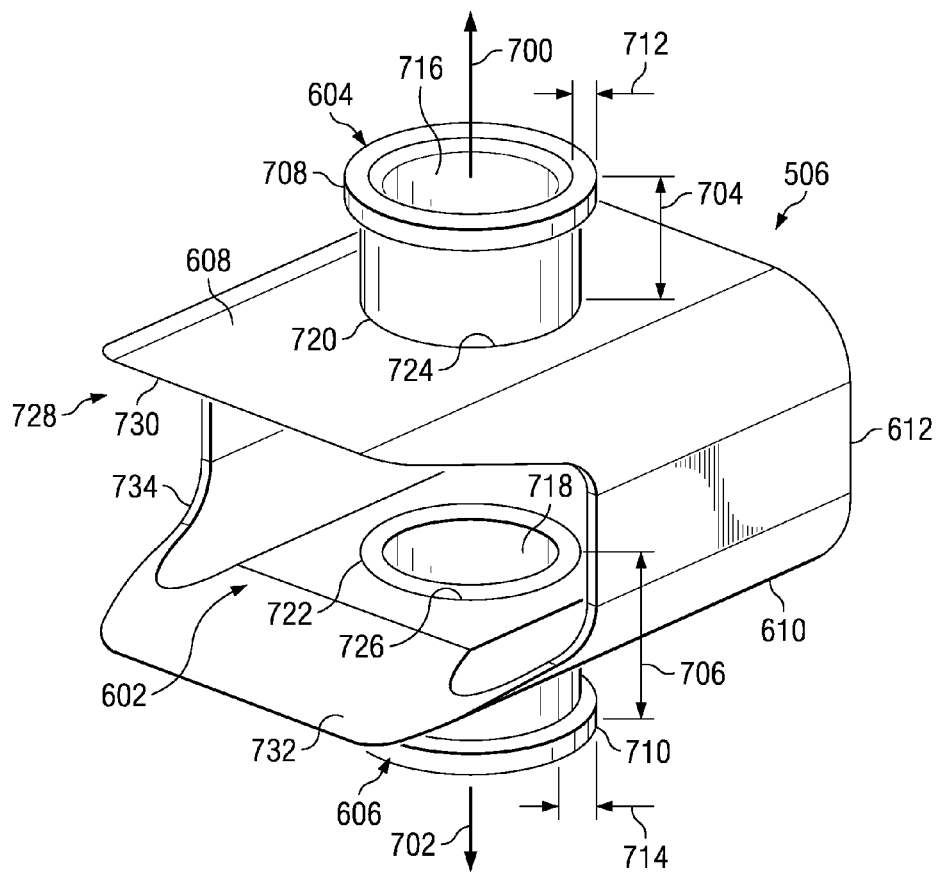
FIG. 7 is a diagram of a retention system in accordance with an advantageous embodiment.

With reference next to FIG. 7, a diagram of a retention system may be depicted in accordance with an advantageous embodiment. In this example, retention system 506 may be shown without tension-torsion strap 510. As can be seen in this view, bushing 604 has center axis 700, while bushing 606 may have center axis 702. Center axis 700 and center axis 702 may be substantially aligned with each other in these examples.

Bushing 604 and bushing 606 may reduce gap 396 in FIG. 3. Gap 396 may be reduced by the extension of bushing 604 by distance 704 and the extension of bushing 606 by distance 706. Wall 708 of bushing 604 and wall 710 of bushing 606 may have thickness 712 and thickness 714, respectively, that may be sufficient to reduce bending of a pin placed through channel 716 and channel 718 of bushing 604 and bushing 606, respectively.

In this example, retention system 506 may be formed from an insertion of bushing 604 and bushing 606 into hole 720 in top side 608 and hole 722 in bottom side 610 to create interference fit 724 and interference fit 726. In these illustrative examples, an interference fit may be a fastening of two parts such as, for example, without limitation, bushing 604 and sleeve 612, achieved by friction after the parts are pushed together. The interference fit may be created by, but not limited to, press-fit, thermal shrink-fitting, oversize mandrel pass-thru, or other means to accomplish compression of one part against another part.

Ramp system 728 may include ramp 730 and ramp 732 located at opening 602 within sleeve 612. Ramp system 728 may aid in guiding insertion of tension-torsion strap 510 including bushing shoe 734 into opening 602 to position tension-torsion strap 510 into a position to be secured to hub 306 using pin 388 substantially in alignment with center axis 702. In this manner, ramp system 728 may promote blind assembly. In other words, an operator may not need to have a view of opening 602 to insert tension-torsion strap 510.

Figure 8:
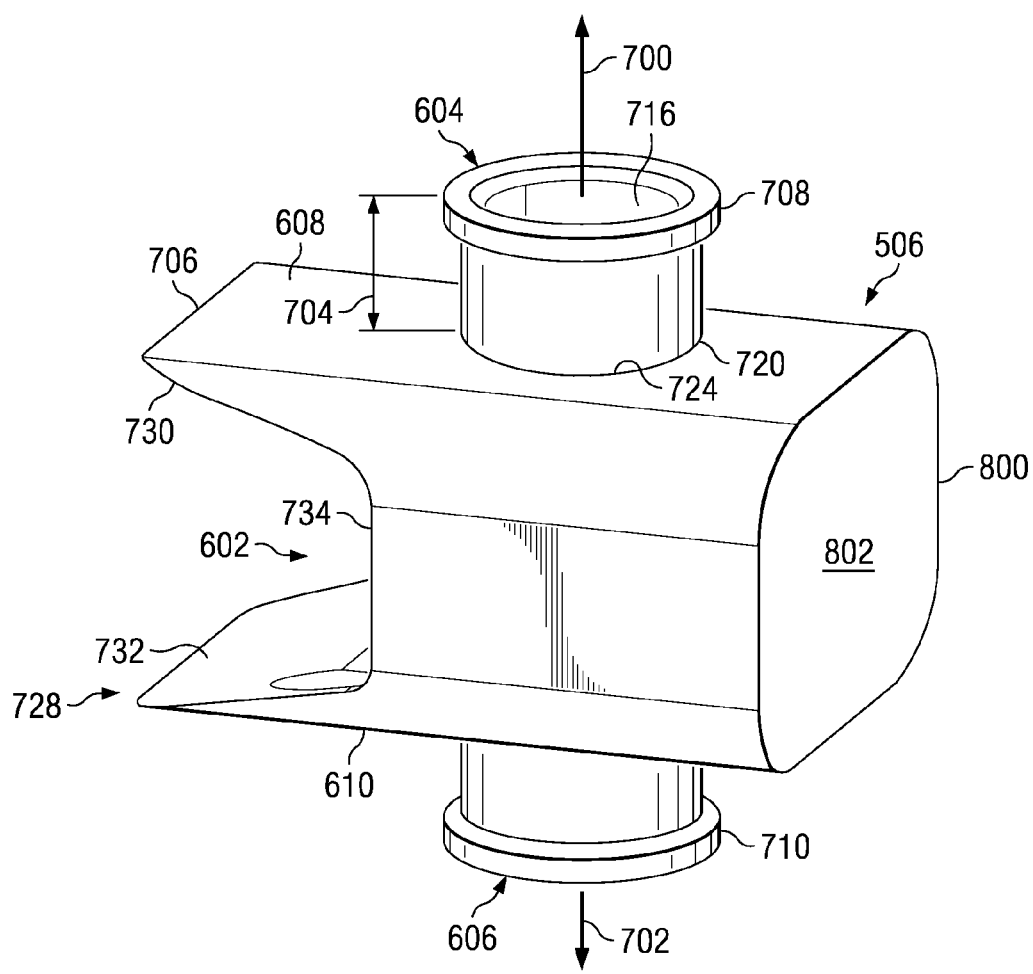
FIG. 8 is another view of a retention system in accordance with an advantageous embodiment.

With reference now to FIG. 8, another view of a retention system may be depicted in accordance with an advantageous embodiment. In this perspective view of retention system 506, end 800 of sleeve 612 has wall 802. Wall 802 may function as an environmental barrier to substantially prevent particles and/or moisture. For example, without limitation, wall 802 may prevent particles and/or moisture from entering interior 362 of hub 306 in FIG. 3.

Figure 9:
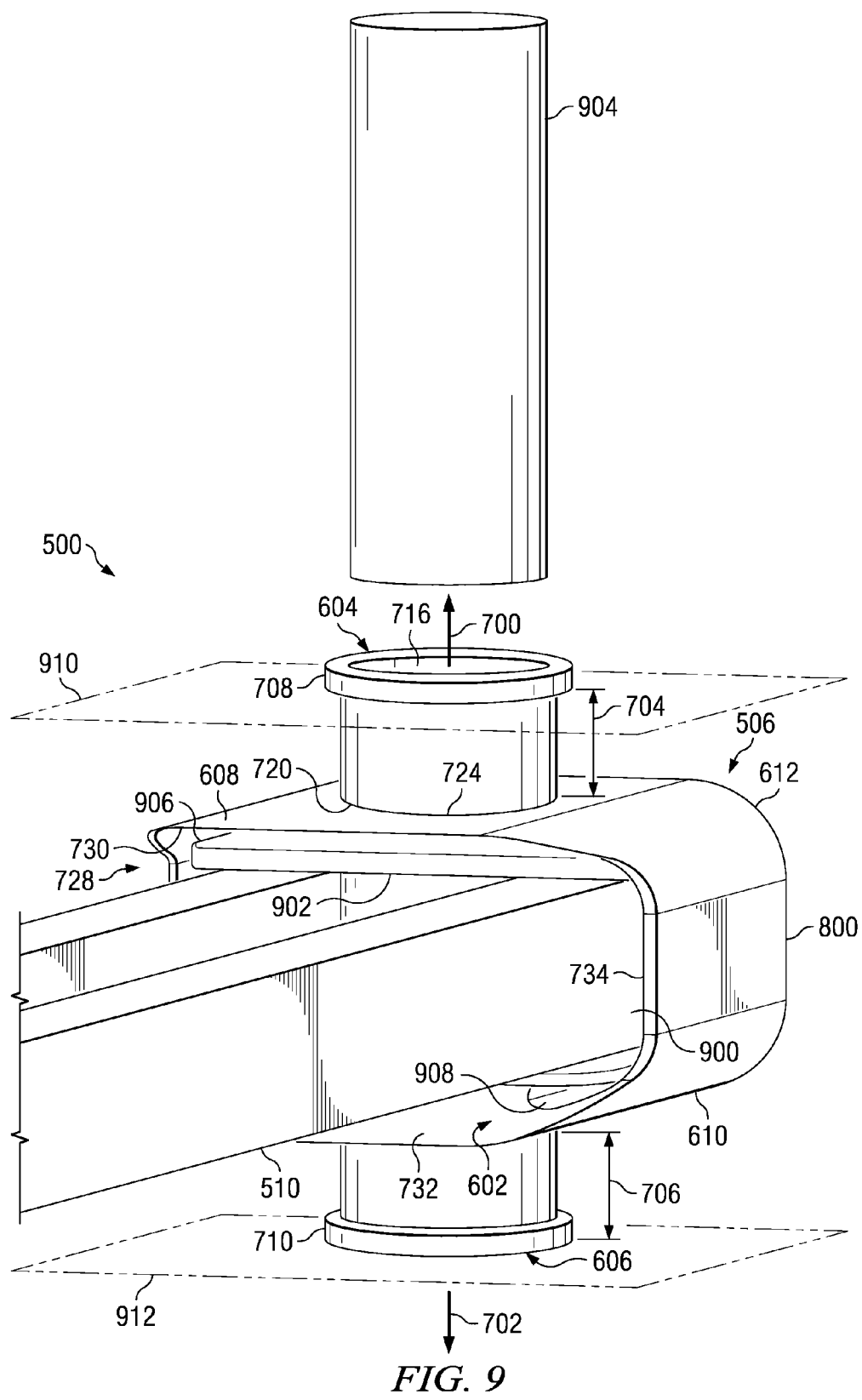
FIG. 9 is another view of a retention system with a tension-torsion strap in accordance with an advantageous embodiment.

With reference now to FIG. 9, another view of a retention system with a tension-torsion strap may be depicted in accordance with an advantageous embodiment. In this illustration, end 900 of tension-torsion strap 510 may be inserted into opening 602 of sleeve 612. The insertion of tension-torsion strap 510 may be guided by ramp 732 at opening 602. As can be seen in this example, end 900 of tension-torsion strap 510 may have lug 902 which may receive a pin 904 inserted through bushing 604 and/or bushing 606 in these examples. Space 906 and space 908 may be an example of gap 396. In this example, a portion of top 910 and bottom 912 of hub 500 may be seen in phantom. Distance 704 and distance 706 represent the thickness of the hub that may interface with bushing 604 and bushing 606 and may include an interference fit to provide support when pin 904 may be installed.

The illustrations of rotor system 501, retention system 506, and retention system 508 in FIGS. 5-9 are not meant to imply structural or physical limitations to the manner in which these different components may be implemented. Different advantageous embodiments may include other components in addition to or in place of the ones illustrated in these depicted examples. For example, in other advantageous embodiments, hub 500 may have additional arms in addition to arms 502 and 504. For example, without limitation, hub 500 may have three arms, four arms, or some other number of arms depending on the number of blades used.

Figure 10:
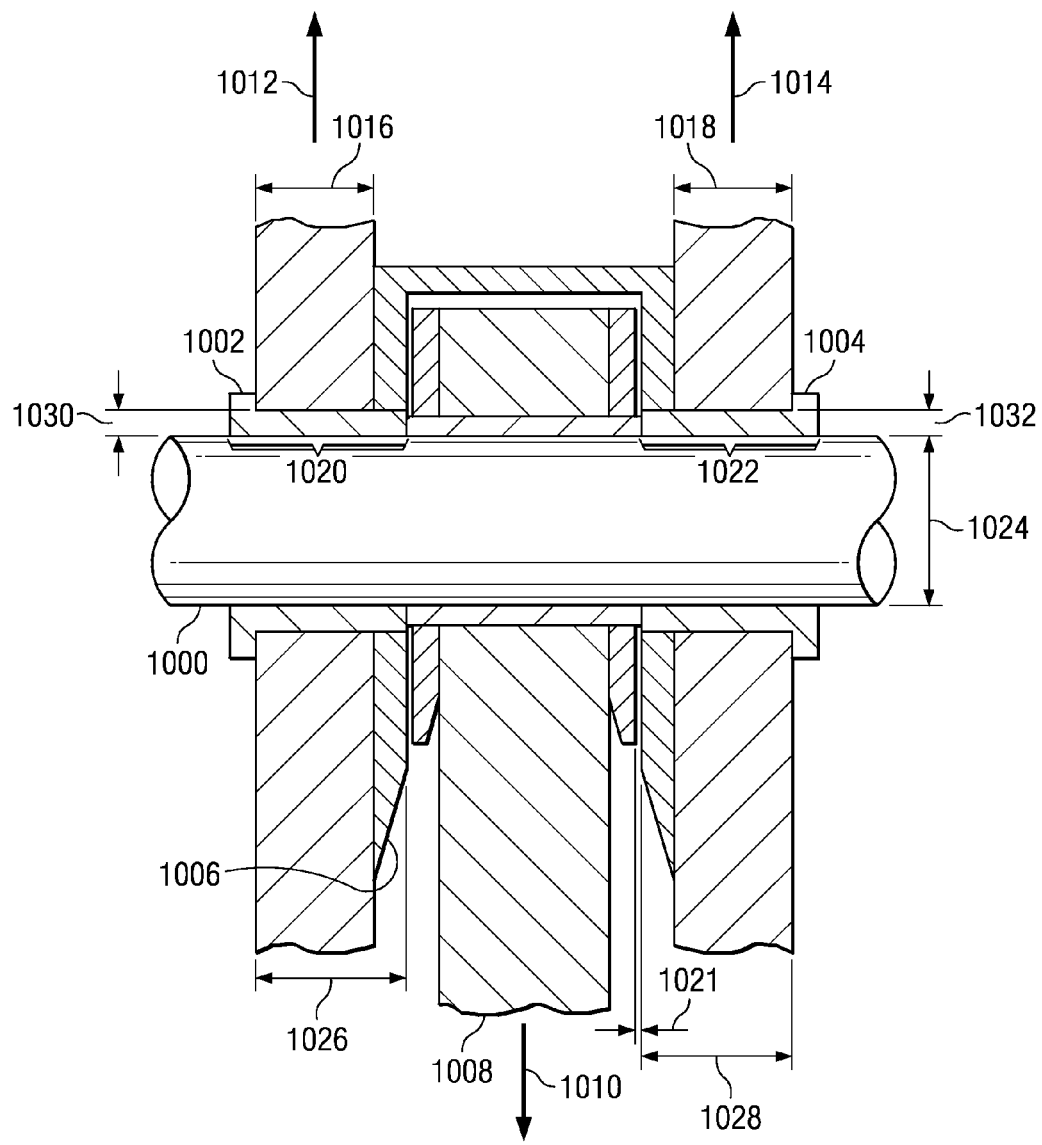
FIG. 10 is a diagram illustrating forces on a pin in a sleeve in accordance with an advantageous embodiment.

With reference now to FIG. 10, a diagram illustrating forces on a pin in a sleeve may be depicted in accordance with an advantageous embodiment. In this example, pin 1000 may be placed through bushing 1002 and bushing 1004 in sleeve 1006. Tension-torsion strap 1008 may generate force 1010. Bushing 1002 and sleeve 1006 may generate shear force 1012, while bushing 1004 and sleeve 1006 may generate shear force 1014 in response to force 1010. In this example, pin 1000 may be under a double shear as illustrated by shear force 1012 and shear force 1014.

In these examples, shear force 1012 may be applied over width 1016, while shear force 1014 may be applied over width 1018. As can be seen in these examples, the use of sleeve 1006 with bushing 1002 and bushing 1004 may reduce gap 1021.

Bushing 1002 and/or bushing 1004 may provide additional surface 1020 and surface 1022 for bearing on pin 1000. In these examples, the bearing may be width 1024 of pin 1000 multiplied by a thickness of sleeve 1006 with bushing 1002 and/or bushing 1004. Length 1026 and wall thickness 1030 of bushing 1002 and length 1028 and wall thickness 1032 of bushing 1004 may be selected to provide an appropriate support for shear forces 1012 and 1014. Wall thickness 1030 and wall thickness 1032 may be key features providing support to pin 1000 by having sufficient thickness. By reducing and/or preventing rotational movement of pin 1000, bushings 1002 and 1004 may provide additional support for pin 1000.

Figure 11:
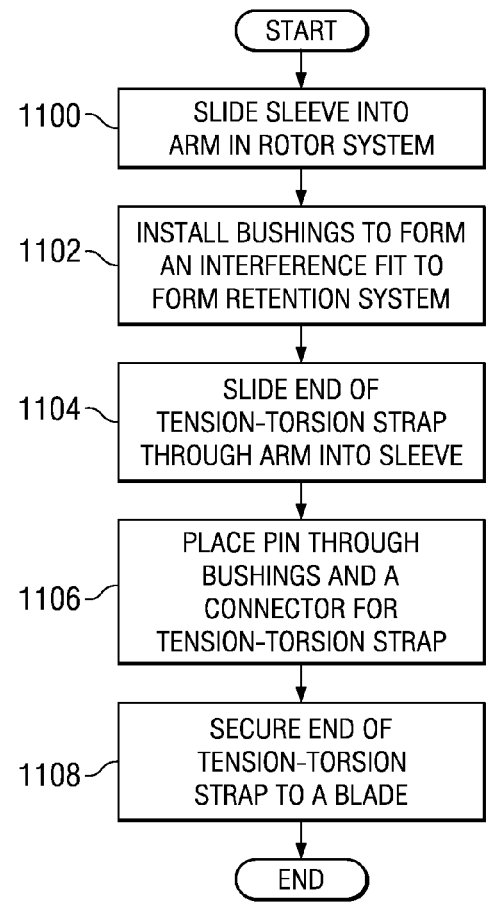
FIG. 11 is a flowchart of a process for connecting a tension-torsion strap in accordance with an advantageous embodiment.

With reference now to FIG. 11, a flowchart of a process for connecting a tension-torsion strap may be depicted in accordance with an advantageous embodiment. The process illustrated in FIG. 11 may be performed to assemble rotor system 300 in FIG. 3.

The process begins by sliding sleeve 328 into arm 502 in rotor system 501 (operation 1100). The process then aligns holes in sleeve 328 with holes in hub 306. Bushings 368 and 374 may be installed to form an interference fit to form retention system 324 (operation 1102). The interference fit formed in operation 1102 may be with bushings 368 and 374 and sleeve 612. In other advantageous embodiments, the interference fit may also be with bushings 368 and 374 and hub 500. In yet other advantageous embodiments, the interference fit may be between bushings 368 and 374 and hub 500.

First end 318 of tension-torsion strap 312 may be slid through arm 386 into sleeve 328 (operation 1104). Pin 388 may be then placed through bushings 368 and 374 and a connector such as lug 392 for tension-torsion strap 312 (operation 1006). Second end 316 of tension-torsion strap 312 may be secured to blade 314 by pin 301 (operation 1008), with the process terminating thereafter.

The illustration of the flowchart in FIG. 11 is not meant to limit the manner in which different installations may be performed. The different operations are presented as one example of an implementation for installing a tension-torsion strap to a hub. Other advantageous embodiments may include other operations in addition to or in place of the ones illustrated. For example, in some advantageous embodiments, the bushings may be pre-installed into the sleeve and placed into the hub. In yet other advantageous embodiments, the tension-torsion strap may be attached to the blade prior to being secured to the hub.

Thus, the different advantageous embodiments provide a method and apparatus for securing a blade to a hub and a rotor system. In the different advantageous embodiments, a retention system may be employed to reduce bending of a pin placed through bushings in the sleeve of the retention system. Further, this retention system may reduce pin bending by providing additional structure for a pin that spreads out and/or distributes shear force applied to the pin during operation.

Also, the retention system in one or more advantageous embodiments may include a ramp system to aid in the installation of a tension-torsion strap. Further, the ramp system also may allow blind assembly, without requiring visual guidance. The different advantageous embodiments also may include a wall to serve as an environmental barrier. This environmental barrier may reduce and/or prevent particles and/or moisture from entering the interior of the hub.

The description of the different advantageous embodiments has been presented for purposes of illustration and description and is not intended to be exhaustive or limited to the embodiments in the form disclosed. Many modifications and variations will be apparent to those of ordinary skill in the art. Although the different depicted embodiments have been described and illustrated with respect to an aircraft in the form of a helicopter, other advantageous embodiments may be applied to any type of rotary machinery, which may operate with arms rotating in a substantially horizontal position.

For example, without limitation, the different advantageous embodiments may be applied to a tilt rotor aircraft. Further, different advantageous embodiments may provide different advantages as compared to other advantageous embodiments. The embodiment or embodiments selected are chosen and described in order to best explain the principles of the embodiments and the practical application, and to enable others of ordinary skill in the art to understand the disclosure for various embodiments with various modifications as are suited to the particular use contemplated.

What is claimed is:

1. An apparatus comprising:
 a housing having a first end, a second end, a first side, a second side, an opening located in the first end, and a passage extending from the opening;
 a first member extending from the first side, wherein the first member has a first channel in communication with the passage and the first channel has a first center axis;
 a second member extending from the second side, wherein the second member has a second channel in communication with the passage and the second channel has a second center axis substantially aligned with the first center axis of the first channel in the first member;
 a hollow lug extending between the first member and the second member, the lug fixed to neither the first member nor the second member;
 a tension-torsion strap looped around the lug and extending outwardly from the passage; and
 a pin extending through all of: the first channel of the first member, the second channel of the second member, and the hollow lug.

2. The apparatus of claim 1, wherein the housing has a number of ramps capable of guiding an insertion of a tension-torsion strap into the passage.

3. The apparatus of claim 1, wherein the second end of the housing forms an environmental barrier.

4. The apparatus of claim 1, wherein the first member extends in a first direction substantially normal to the first side of the housing and wherein the second member extends in a second direction substantially normal to the second side of the housing.

5. The apparatus of claim 1, wherein the first member and the second member each have a wall thickness sufficient to support the pin, the pin used to attach the housing to a rotor.

6. The apparatus of claim 1, wherein the first member is a first bushing and wherein the second member is a second bushing.

7. The apparatus of claim 6, wherein each of the first bushing and the second bushing has a wall with a thickness configured to reduce bending of the pin.

8. The apparatus of claim 7, wherein the first bushing and the second bushing reduce a gap between the tension-torsion strap, a first wall, and a second wall of a hub when the tension-torsion strap is secured to the first wall and the second wall by the pin placed through the first bushing and the second bushing.

9. The apparatus of claim 1, wherein the housing is a sleeve.

10. The apparatus of claim 1 further comprising:
a hub, wherein the housing is located within the hub;
a blade; and
wherein the tension-torsion strap is connected to the blade.

11. The apparatus of claim 10, wherein the tension-torsion strap allows for torsional movement and has an axial strength capable of retaining the blade to the hub.

12. The apparatus of claim 11, wherein the first member and the second member provide support to the pin and reduce bending moment forces on the pin.

13. The apparatus of claim 10 further comprising:
an airframe;
a spindle, wherein the hub is attached to the spindle; and
a drive system attached to the airframe and the spindle, wherein the drive system is capable of rotating the spindle.

14. An apparatus comprising: a sleeve having a first end, a second end, a first side, a second side, an opening located in the first end, and a passage extending from the opening in the first end towards the second end in the sleeve, wherein at least one wall defining the passage has a number of ramps capable of guiding the insertion of a tension-torsion strap into the passage, and wherein the second end forms an environmental barrier;
a first bushing having a first end and a second end, the first bushing extending through and from the first side in a first direction substantially normal to the first side of the sleeve, wherein the first bushing has a first channel in communication with the passage in the sleeve and the first channel has a first center axis;
a second bushing having a first end and a second end, the second bushing extending through and from the first side in a second direction substantially normal to the second side of the sleeve, wherein the second bushing has a second channel in communication with the passage in the sleeve and the second channel has a second center axis that is substantially aligned with the first center axis;
the tension-torsion strap, wherein a first end of the tension-torsion strap extends through the passage in the sleeve; and
a pin extending through the first channel, a loop of the first end of the tension-torsion strap, and the second channel to connect the first end of the tension-torsion strap to the sleeve, wherein the first bushing and the second bushing each have a wall thickness sufficient to support the pin and to reduce bending moment forces on the pin, wherein the first bushing and the second bushing reduce a gap between the tension-torsion strap and a first wall and a second wall of a hub when the tension-torsion strap is secured to the first wall and the second wall by the pin placed through the first bushing and the second bushing, and wherein the tension-torsion strap allows for torsional movement and has an axial strength capable of retaining a blade to the hub.

15. The apparatus of claim 14 further comprising:
the hub, wherein the sleeve is located inside hub;
the blade, wherein the tension-torsion strap has the first end connected to the sleeve and a second end connected to the blade.

16. The apparatus of claim 15 further comprising:
an airframe;
a spindle, wherein the hub is attached to the spindle; and
a drive system attached to the airframe and the spindle, wherein the drive system is capable of rotating the spindle.

* * * * *